United States Patent [19]

Renier

[11] Patent Number: 5,667,606
[45] Date of Patent: Sep. 16, 1997

[54] TIRE PRESSURIZING AND REGULATING APPARATUS

[75] Inventor: Grant J. Renier, Allison Park, Pa.

[73] Assignee: Cycloid Company, Cranberry Township, Pa.

[21] Appl. No.: 675,916

[22] Filed: Jul. 5, 1996

[51] Int. Cl.$^6$ ................................................ B60C 23/12
[52] U.S. Cl. ........................ 152/421; 152/418; 417/211; 417/233
[58] Field of Search .................... 152/415, 418, 152/419, 421; 417/211, 231, 233

[56] References Cited

U.S. PATENT DOCUMENTS

| | | | |
|---|---|---|---|
| 1,127,079 | 2/1915 | Nielsen | 152/418 |
| 1,679,505 | 8/1928 | Stewart | 152/418 |
| 1,744,405 | 1/1930 | McCord | 152/418 |
| 1,776,933 | 9/1930 | Simmen | 152/418 X |
| 1,875,874 | 9/1932 | Johnson | 152/418 |
| 2,141,542 | 12/1938 | Mann, Jr. | 152/418 X |
| 2,161,384 | 6/1939 | Rinfret | 152/418 |
| 2,211,935 | 8/1940 | Parker | 152/418 |
| 2,256,469 | 9/1941 | Parker | 152/418 |
| 2,317,636 | 4/1943 | Parker | 152/418 X |
| 2,415,618 | 2/1947 | West | 417/233 |
| 5,342,177 | 8/1994 | Cheng | 417/233 |

*Primary Examiner*—Michael W. Ball
*Assistant Examiner*—Francis J. Lorin
*Attorney, Agent, or Firm*—Carothers & Carothers

[57] ABSTRACT

An apparatus for pressurizing a pneumatic tire mounted on a vehicle wheel which includes a displacement type air pump having a spring loaded piston and cylinder combination for generating air under pressure. The air pump is axially attached to the vehicle wheel and an air pressure connection conduit introduces air under pressure generated from the pump into the pneumatic tire. A cam and cam follower arrangement is mounted in the housing for the pump for creating relative cam actuated movement therebetween which is utilized for driving the air pump. A pendulum is mounted for free axial rotation relative to the pump housing and the pendulum is connected to one of the cam or cam follower, and the other is secured to the pump housing for rotation therewith to provide this cam actuated driving movement. The axis of piston reciprocation in its cylinder is substantially aligned axially with the wheel axis of rotation. In addition, the cam follower is provided with a ramp tracking surface having points of maximum and minimum rise which dictate the limits of reciprocation of the piston and a step in this cam follower surface is provided which connects the maximum and minimum points of rise for providing a rapid compression stroke of the piston under spring bias.

25 Claims, 3 Drawing Sheets

TIRE PRESSURIZING AND REGULATING APPARATUS

BACKGROUND OF THE INVENTION

The invention relates to a novel means and mechanism for maintaining air pressure in pneumatic tires of motor vehicles, such as automobiles and trucks, and more particularly to such a novel device which automatically maintains a desired and predetermined tire pressure. The apparatus of the present invention for automatically pressurizing and regulating pneumatic tires is attachable to a vehicle wheel and is operated by the rolling motion thereof.

Numerous tire pressurizing and regulating apparatus for motor vehicle wheels have been invented and/or previously developed. However, they tend to be expensive to manufacture and/or inefficient in operation.

In U.S. Pat. No. 1,127,079, Nielsen illustrates a pendulum operated air compressor which is mounted on a wheel to automatically inflate a pneumatic tire mounted on a wheel. While the basic concept disclosed is meritorious, nevertheless, the apparatus is impractical by today's standards, cumbersome, expensive to manufacture and inefficient in operation. The linkage utilized to operate the compressor from the pendulum is a crank-arm mechanism which cannot efficiently operate and causes the wheel to rotate in an unbalanced condition, which is not acceptable for modem fast moving vehicles. In addition, the pendulum mechanism itself is exposed to the elements and therefore subject to interference and contamination by dirt, snow, etc.

In U.S. Pat. No. 5,342,177, Cheng illustrates an automatic pneumatic pump which also uses a cylinder and piston assembly which rotates with the wheel and the pneumatic tire mounted on the wheel. The piston is reciprocated by contact with a stationary cam to provide pressurized air to the tire. The stationary cam is secured with the stationary bicycle axle. This pneumatic pump assembly is meritorious in that a relatively efficient cam mechanism is utilized to operate the pump, instead of the cumbersome assembly illustrated in Nielsen.

Major problems with the Cheng automatic pneumatic pump device are that it is not readily adaptable to use on a motorized vehicle such as an automobile or truck. In addition, Cheng's pump construction requires that his cylinder and piston assembly must rotate off center with the wheel and by necessity also provide a camming action which imparts a camming thrust radially outward from the wheel axle. The combination of these requirements is that the wheel is caused to be measurably unbalanced, which is intolerable for fast moving motor vehicle wheels, even though it may be acceptable for bicycle wheels. This unbalanced condition also adds to wear and tear on the pump mechanism.

U.S. Pat. Nos. 1,744,405 and 2,415,618 are respectively issued to West and McCord and illustrate pendulum operated air pumps for automatically inflating vehicle pneumatic tires. These pumps are greatly simplified from the prior art pendulum pump illustrated in Nielsen, but have some of the same short comings.

Again, the piston cylinder combinations utilized in West and in McCord, are of a construction which requires that the entire cylinder and piston assembly must rotate off center about the axis of rotation of the wheel, thereby requiring the pump to operate and the wheel to operate in an unbalanced condition. Also the camming mechanisms create additional unbalancing forces which are applied adversely to the rotating wheels.

Other problems encountered with all of the aforementioned prior art structures are that their exhaust or outlet check valves utilized in their piston-cylinder combinations are very much adversely affected by centrifugal forces. As the respective wheels of the prior art devices rotate faster, increased centrifugal force is imparted to the respective outlet check valves of the prior art pumps. Accordingly, with all of the prior art pumps, the air pressure being exhausted from the respective pumps varies tremendously in accordance with the rotation velocity of the wheel to which the pump is attached. The spring loaded outlet valves can therefore not be utilized for or relied upon to regulate air pressure to the pneumatic fire, and at higher wheel velocities will not provide adequate air pressure due to the leaking of the valves created by the applied centrifugal force. Accordingly, with the prior art pumps, a higher pump pressure or differential pressure must be provided in order to effectively operate them, and this in turn requires costlier manufacturing techniques.

Additionally, all of these pendulum operated pumps of the prior art teach the use of conventional piston and cylinder combinations wherein the compression and intake or retraction strokes are equal in velocity. In other words, the piston compression strokes of the prior art pumps are relatively slow and therefore require exacting tolerances in piston and cylinder fit, thereby making the prior art pumps less efficient due to the frictional engagement and of greater mass than desired to house the tight tolerance fitting piston and cylinder combination.

It is a principal object of the present invention to provide a pendulum operated pump for harnessing and utilizing the rotational forces of a vehicle wheel for pressurizing and regulating the pressure of a pneumatic tire carried by the wheel with a pump mechanism which is inexpensive to manufacture and efficient and balanced in operation.

SUMMARY OF THE INVENTION

The apparatus of the present invention for pressurizing a pneumatic tire generally consists of a displacement type air pump for generating air under pressure which is axially secured to the vehicle wheel.

The air pump is mounted in a housing that is axially attached to the vehicle wheel having a pneumatic tire mounted thereon and a connection is made between the pump and the tire, such as through the tire valve stem, for introducing air under pressure generated from the pump into the pneumatic tire.

The present invention resides in the mechanism which is utilized to operate the pump. The air pump mechanism includes a cam that is axially mounted in the pump housing and also a cam follower which is mounted in the pump housing and engages the cam to create or form a relative cam actuated movement therebetween, and it is this cam actuated reciprocal movement which is utilized for driving the air pump.

A weighted pendulum is also mounted within the pump housing for free axial rotation relative to the housing, the housing along with the pump of course rotating with the wheel.

This free pendulum tends to stay stationary relative to the rotating wheel and pump housing and the pendulum is connected to one of the cam or the cam follower and the other thereof is secured to the pump housing for rotation therewith to provide the reciprocal driving movement. In other words, either the cam or the cam follower is held relatively stationary and non-rotating by the pendulum, which is mounted in the pump housing on a frictioness bearing, such as a ball bearing race, at its upper proximal end opposite the pendulum weight. If the cam is connected to the pendulum, the cam then remains relatively stationary and does not rotate with the housing and the cam follower rotates with the housing and tracks over the cam surface of the cam to create the cam actuated relative movement between the two.

On the other hand, if the pendulum is secured to the cam follower, then the cam follower remains substantially stationary relative to the rotating pump housing. The cam is secured to the pump housing and rotates therewith to rotate the cam surface to track over the cam follower, thereby creating the reciprocal movement required to actuate the pump.

A conventional pressure level mechanism is also provided and connected to the pump for establishing and maintaining a desired air pressure in the tire at a predetermined level.

The piston and cylinder combination utilized in the pneumatic pump of the present invention has an axis of piston reciprocation (no matter whether the piston reciprocates in the cylinder or the cylinder reciprocates on the piston) which is substantially or preferably aligned axially with the wheel axis of rotation. This keeps the unit entirely in balance as the wheel rotates, unlike the prior art pneumatic pump devices.

Also, the spring biased outlet valve for the piston-cylinder combination of the present invention has a valve member which is displaceable off of its valve seat along a central axis of displacement which is substantially aligned axially with the wheel axis of rotation. The result is that the exhaust or outlet valve of the pump apparatus of the present invention is not influenced in any manner by centrifugal forces created by the rotating wheel to which the pump is attached.

The cam in the cam actuated mechanism of the pump of the present invention is provided with a cam follower ramp tracking surface which has points of maximum and minimum rise which respectively dictate the limits of reciprocation of the piston-cylinder combination. This cam ramp tracking surface is provided with a step which connects the maximum and minimum points of rise on the cam surface for thereby providing a very rapid compression stroke of the piston under spring bias within its cylinder. This rapid compression stroke, which is excessively rapid compared to the intake or retraction stroke, creates a very high compression stroke and permits the tolerances between the piston and cylinder to be relaxed thereby permitting a minimal constant blow-by. This provides a pump with lower fit tolerance requirements and therefore less friction, which in turn permits the construction of a pump that requires a smaller pendulum weight for actuation, wears much less, is less expensive to manufacture and requires a lower overall pump mass which in turn also minimizes manufacturing expenses. This unique combination also additionally provides a more constant pump outlet pressure which can in itself be utilized to regulate or to assist in regulating the maximum desired inflation pressure of the pneumatic tire being inflated.

In addition, the cam is also designed such that it has a cam follower ramp tracking surface which basically tracks a circular path that is transverse to and centered on the axis of piston-cylinder reciprocation. The result is that all camming action to operate the pump occurs with axially extending thrusts which do not affect the balanced condition of the wheel and tire under operation, again unlike the prior art structures.

BRIEF DESCRIPTION OF THE DRAWINGS

The accompanying drawings show for the purpose of exemplification, without limiting the invention or the appended claims, certain practical embodiments of the present invention wherein:

DETAILED DESCRIPTION OF PREFERRED EMBODIMENTS

Figure 1:
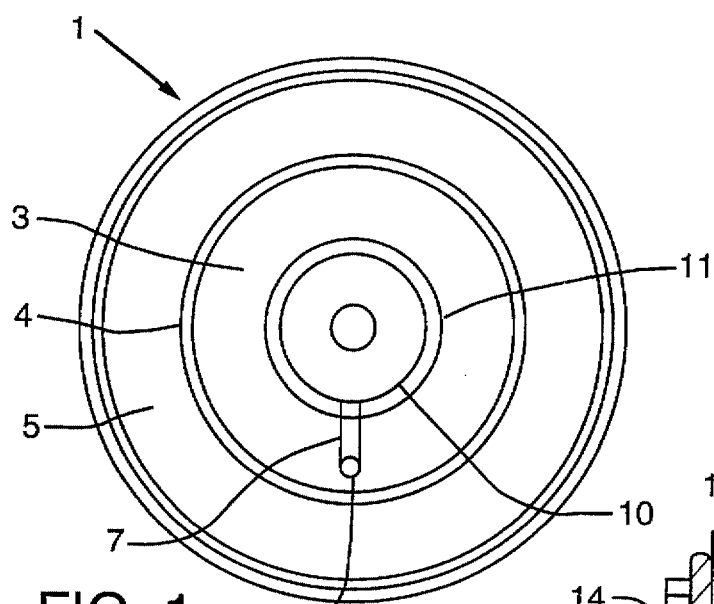
FIG. 1 is a schematic from view of a common and well known truck tire, wheel and valve stem assembly to which the apparatus of the present invention has been associated in a working position.

Referring to FIG. 1, there is illustrated a typical truck tire-wheel assembly 2 of a motor vehicle, not shown, comprised of a wheel 3, a rim 4 and a valve stem 6. The valve stem 6 is a common type of valve stem typically used to inflate the pneumatic tire 5 mounted on wheel 3.

The tire pressurizing and regulating apparatus 10 of the present invention is axially mounted on the truck wheel hub 11 for axial rotation therewith.

The apparatus 10 is connected to valve stem 6 via tube 7 in order to introduce air under pressure generated from the pump within apparatus 10 into pneumatic tire 5.

Figure 2:
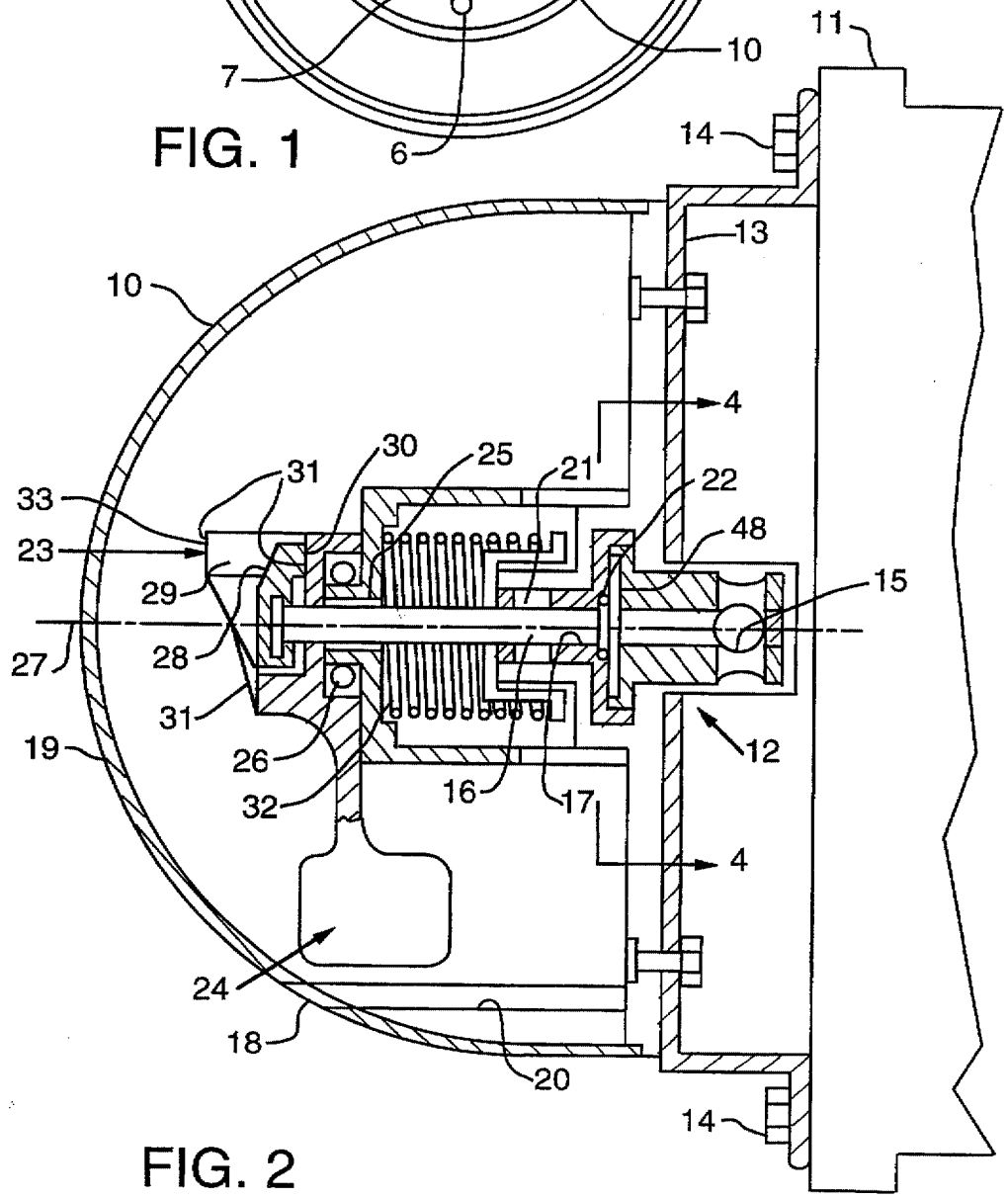
FIG. 2 is a schematic vertical side view in partial mid section of a preferred embodiment of the pneumatic tire pump/regulator constructed in accordance with the teachings of the present invention and which is releasably attached axially to a vehicle wheel.

Referring to FIG. 2, the apparatus 10 for pressurizing a pneumatic tire includes a displacement type air pump 12 for generating the required air under pressure. Pump 12 is enclosed and retained by pump housing 13, which in turn is axially and securely bolted to the truck wheel hub 11 by means of bolts as indicated at 14.

Pressurized air is emitted from pump 12 at outlet 15 which, as shown in FIG. 1, is connected via tube 7 to valve stem 6 in order to pressurize pneumatic tire 5.

Pump 12 is operated by a unique pendulum and cam combination. Pump 12 basically consists of a piston 16 which is reciprocal horizontally left and right as viewed in FIG. 2 within cylinder 17 and piston bearing 25. Fresh ambient air is supplied to the pump 12 via input air filter 18 and the input air continues to pass through passage 20 and onto and through inlet air orifice 21 into cylinder 17 when piston 16 is in its fully retracted intake position to the far left as viewed in FIG. 2 due to reciprocal actuation strokes of the piston by the pump 12.

When piston 16 moves to the right as viewed in FIG. 2 on its full compression stroke, which is shown as being completed in FIG. 2, one way outlet valve 22 permits the air under pressure to escape outwardly to pressurized air outlet 15 and then to the tire for pressurization.

Piston 16 is reciprocated within cylinder 17 by the combination pendulum-cam mechanism consisting of the cam or pendulum cam 23, which is part of and secured to the proximal end of pendulum 24, and cam follower 28, which is part of piston 16.

Pendulum 24 is provided with a pendulum weight 25 at its bottom or distal end and pendulum 24 is mounted for free axial rotation relative to housing 13 and wheel hub 11 by means of pendulum thrust bearing 26.

Thus as housing 13 along with truck hub 11 and piston 16 rotate about axis 27, pendulum 24 together with pendulum cam 23 remain relatively stationary within housing 13. Cover 19 is detachably secured to housing 13 for sealing pendulum 24 and associated pump parts from contamination.

Piston cam follower 28 is mounted on the outer or left end of piston 16 and is keyed to piston 16 so that cam follower 28 rotates about axis 27 with piston 16.

Thus as the truck wheel rotates, truck wheel hub 11 rotates and so does the entire pump housing 13 and so also does piston cam follower 28 and piston 16. This causes the cam follower tip 30 to ride or track in a circle on the relatively stationary cam ramp surface 31 of pendulum cam 23. In so doing, cam follower 21, being rigidly secured to the end of piston 16, causes piston 16 to move to the left on an intake stroke as viewed in FIG. 2 against the pressure of compression spring 32. The circular path of cam ramp surface 31 is centered on and perpendicular to axis 27, which minimizes the effect of camming thrusts on the rotating wheel.

Cam follower tip 30 continues to ride on cam surface 31 until it reaches the outer most apex or point of maximum rise of the cam surface as indicated at 33. At this point the cam follower contact surface 30 rides over the apex and step 29 and rapidly springs to the right to a point of minimum rise along with piston 16 under the compression force of compression spring 16 to create an efficient and high compression stroke for the air pump 12. The process is continually repeated thereby causing piston 16 to continually reciprocate in cylinder 17 and thereby cause pump 12 to generate air under pressure which is fed out through pressurized air outlet 15.

Of course many variations of the pump as shown are possible. For example, it is obvious that the cam follower 28 may be retained by or be part of pendulum 24 and that the cam 23 could in fact be integral with or secured to the end of piston 16.

Also, piston 16 is keyed to housing 13 so that it is insured that piston 16 will always rotate with housing 13.

The pump 12 of the present invention is also provided with a pressure level mechanism which establishes and maintains a desired or predetermined level of pressure within the pneumatic tire. In the present instance, the pressure regulating mechanism is built into the pump itself as the pump is designed to pump air under pressure at a maximum level which does not exceed the desired tire pressure.

This is regulated by selecting compression ratio parameters of the pump (such as piston mass, piston stroke length, piston face area, piston blow-by, piston shape, piston friction, cylinder volume, and intake and output orifice size). Other common mechanisms or methods may also be utilized to regulate the air pressure maintained within the tire such as disclosed in the inventor's U.S. Pat. No. 5,409,049, entitled TANGENTIAL TIRE PRESSURIZING AND REGULATING APPARATUS.

In addition, as taught in this patent, the pump of the present invention can be designed to be a double action pump such that piston 16 is a double ended piston reciprocating in opposed cylinders as disclosed in the referenced patent.

Figure 3:
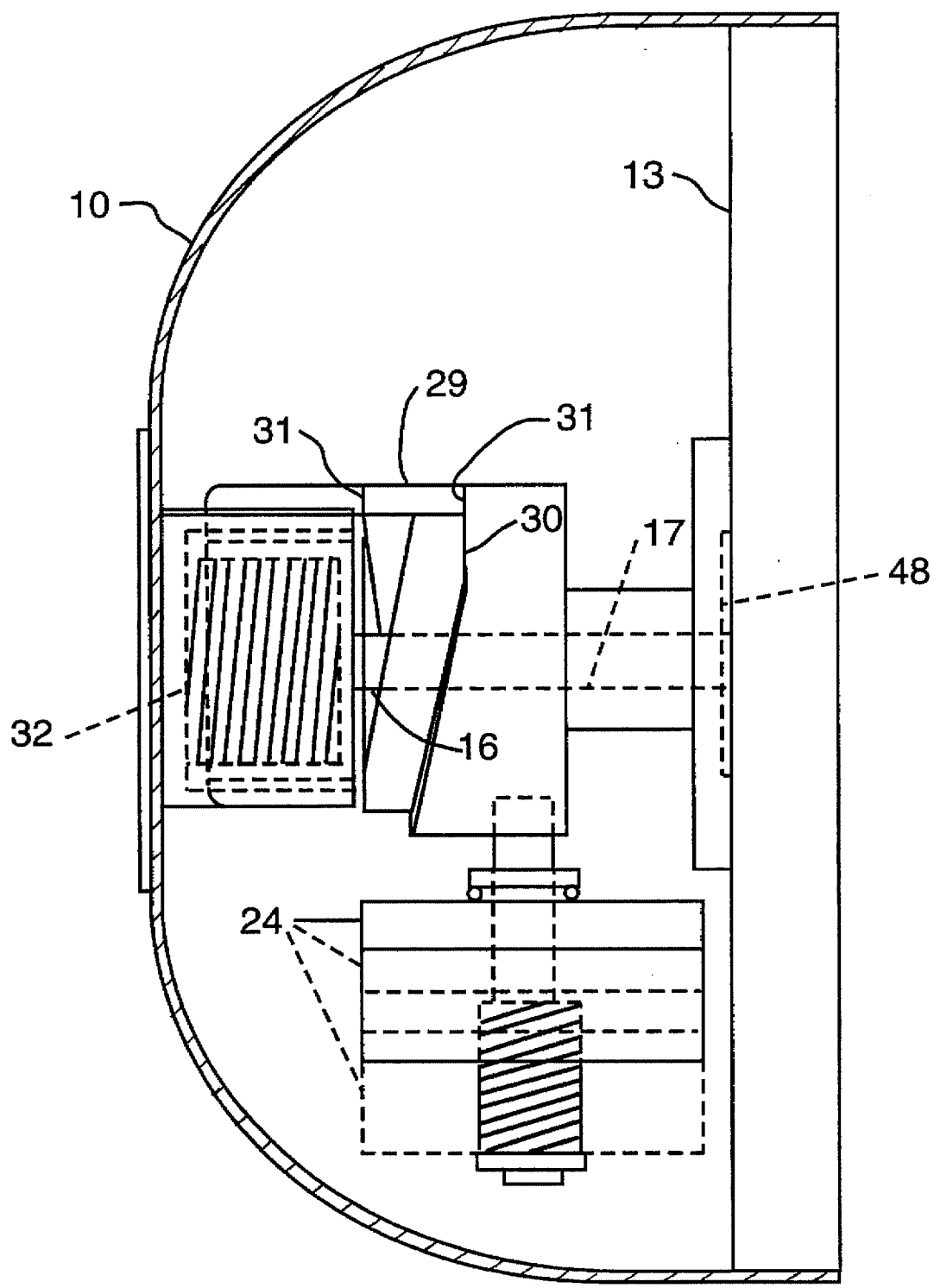
FIG. 3 is a schematic view in partial vertical cross section illustrating a variation of the pneumatic tire pump shown in FIG. 2.

Referring next to the schematic drawing of FIG. 3, the variations in the pump mechanism illustrated are minor in nature and basically the pump configuration of FIG. 3 operates in the same manner as does the pump mechanism illustrated in FIG. 2. Accordingly, parts which are either identical or function in the same manner are designated with the same reference numerals.

The details of the piston 16 and cylinder 17 and exhaust or outlet valve 22 is not illustrated in FIG. 3 as it is identical to that of FIG. 2.

One major difference in the construction of FIG. 3 is that weighted pendulum 24 is provided with an adjustable pendulum arm length.

Secondly, the contours of stepped cam tracking surface 31 and cam follower tip 30 have been modified and cam follower lip 30 has considerably more contact with cam tracking surface 31 in the structure of FIG. 3 than does cam follower 30 in the structure of FIG. 2. Additionally, compression spring 32 in the embodiment of FIG. 3 for spring loading the piston 16 is externally mounted on the pump housing instead of internally as shown in FIG. 2.

Figure 5:
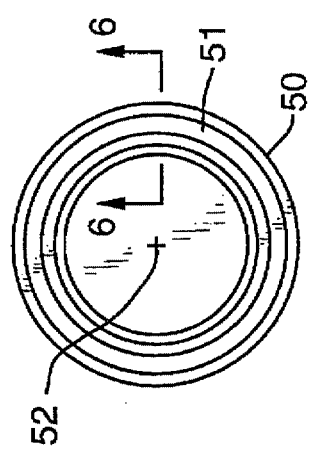
FIG. 5 is a plan view of the valve seat for the exhaust valve mechanism shown in FIG. 4.
Figure 6:
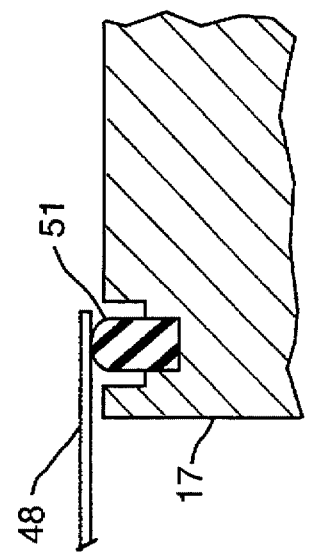
FIG. 6 is a view in cross section of the valve seat structure shown in FIG. 5 as seen along section line A—A.
Figure 4:
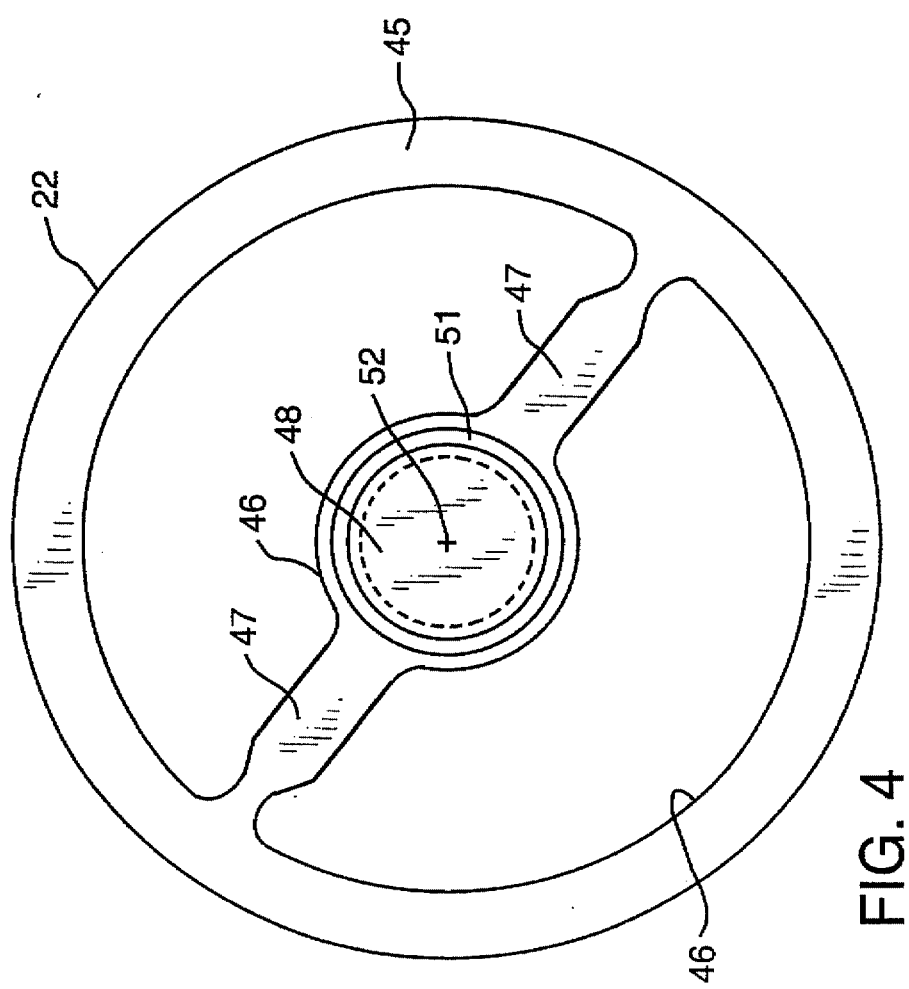
FIG. 4 is a back view of the outlet valve mechanism utilized in the pump apparatus shown in FIG. 2 and as seen along section line 4—4, with all other features of the pump removed for clarity.

Referring next to FIGS. 4, 5 and 6, details of the exhaust or outlet valve 22 are illustrated.

Outlet valve 22 generally consists of a circular shaped piece of flexible metal 45 which is provided with two balanced spiral type cuts 46 on opposite sides which leave spiral shaped spring arms 47 remaining in disk 45 and central outlet or exhaust valve member 48.

Valve member 48 is permitted to rise or extend away from underlying valve seat 50, which includes and seats annular O-ring elastomer valve seat 51, along central axis 52 of the valve.

In other words, when viewing FIG. 4, valve member 48 is permitted to exhaust by extending away from the viewer along axis 52, thereby unsealing valve member from underlying elastomer valve seat 51.

It should be noted that axis 52 of valve member 48 is aligned with the axis of reciprocation of piston 16, and more importantly is aligned with the axis of rotation 27 of the wheel 11. Accordingly, outlet or exhaust valve 22 is not in any way influenced by centrifugal forces which are applied to the pump mechanism by reason of rotating wheel 11.

I claim:

1. An apparatus for pressurizing a pneumatic tire mounted on a wheel adapted for axial rotation, said apparatus comprising:

a displacement type air pump including a spring loaded piston and cylinder combination for generating air under pressure;

a housing for said air pump adapted for axial attachment to a wheel having a pneumatic tire mounted thereon;

an air pressure connection conduit adapted for introducing air under pressure generated from said pump into the pneumatic tire;

a cam mounted in said housing;

a cam follower mounted in said housing and engaging said cam for relative cam actuated movement therebetween which is connected for driving said air pump;

a pendulum mounted for free axial rotation relative to said housing;

said pendulum connected to one of said cam and cam follower and the other thereof secured to said housing for rotation therewith to provide said driving movement;

said piston and cylinder combination having an axis of piston reciprocation in said cylinder which is substantially aligned axially with the wheel axis of rotation.

2. The apparatus of claim 1; said cam having a cam follower ramp tracking surface having points of maximum and minimum rise which dictate the limits of reciprocation of said piston cylinder combination, and a step connecting said maximum and minimum points of rig for providing a rapid compression stroke of said piston under spring bias.

3. The apparatus of claim 2; said tracking surface tracking a circular path that is transverse to and centered on said axis of reciprocation, said piston being reciprocal in said cylinder which is stationary relative to said housing, said piston connected for reciprocation in said cylinder by said driving movement.

4. The apparatus of claim 3 wherein said piston is connected to said cam follower and said pendulum means is connected to said cam.

5. The apparatus of claim 4 wherein said piston is keyed to rotate with said cylinder and said housing.

6. The apparatus of claim 1 including pressure level means operably connected to said pump for establishing and maintaining air pressure in the tire at a predetermined level.

7. The apparatus of claim 1 including a cover which covers said pendulum, said cam and said cam follower for sealing the same from contamination.

8. The apparatus of claim 7 wherein said cover is detachably secured to said pump housing.

9. An apparatus for pressurizing a pneumatic tire mounted on a wheel adapted for axial rotation, said apparatus comprising:

a displacement type air pump including a spring loaded piston and cylinder combination for generating air under pressure;

a housing for said air pump adapted for axial attachment to a wheel having a pneumatic tire mounted thereon;

an air pressure connection conduit adapted for introducing air under pressure generated from said pump into the pneumatic tire;

a cam mounted in said housing;

a cam follower mounted in said housing and engaging said cam for relative cam actuated movement therebetween which is connected for driving said air pump;

a pendulum mounted for free axial rotation relative to said housing;

said pendulum connected to one of said cam and cam follower and the other thereof secured to said housing for rotation therewith to provide said driving movement;

said cam having a cam follower ramp tracking surface having points of maximum and minimum rise which dictate the limits of reciprocation of said piston cylinder combination, and a step connecting said maximum and minimum points of rise for providing a rapid compression stroke of said piston under spring bias.

10. The apparatus of claim 9; said piston and cylinder combination having an axis of piston reciprocation in said cylinder which is substantially aligned axially with the wheel axis of rotation.

11. The apparatus of claim 10; said tracking surface tracking a circular path that is transverse to and centered on said axis of reciprocation, said piston being reciprocal in said cylinder which is stationary relative to said housing, said piston connected for reciprocation in said cylinder by said driving movement.

12. The apparatus of claim 11 wherein said piston is connected to said cam follower and said pendulum means is connected to said cam.

13. The apparatus of claim 12 wherein said piston is keyed to rotate with said cylinder and said housing.

14. The apparatus of claim 9 including pressure level means operably connected to said pump for establishing and maintaining air pressure in the tire at a predetermined level.

15. The apparatus of claim 9 including a cover which covers said pendulum, said cam and said cam follower for sealing the same from contamination.

16. The apparatus of claim 15 wherein said cover is detachably secured to said pump housing.

17. An apparatus for pressurizing a pneumatic tire mounted on a wheel adapted for axial rotation, said apparatus comprising:

a displacement type air pump including a spring loaded piston and cylinder combination for generating air under pressure;

a housing for said air pump adapted for axial attachment to a wheel having a pneumatic tire mounted thereon;

an air pressure connection conduit adapted for introducing air under pressure generated from said pump into the pneumatic tire;

a cam mounted in said housing;

a cam follower mounted in said housing and engaging said cam for relative cam actuated movement therebetween which is connected for driving said air pump;

a pendulum mounted for free axial rotation relative to said housing;

said pendulum connected to one of said cam and cam follower and the other thereof secured to said housing for rotation therewith to provide said driving movement;

said piston and cylinder combination including a one way outlet valve having a valve member which is displaceable from a valve seat along a central axis of displacement for transmitting air under pressure to said air pressure connection conduit, said axis of outlet valve displacement being substantially aligned axially with the wheel axis of rotation.

18. The apparatus of claim 17; said piston and cylinder combination having an axis of piston reciprocation in said cylinder which is also substantially aligned axially with the wheel axis of rotation.

19. The apparatus of claim 18; said cam having a cam follower ramp tracking surface having points of maximum and minimum rise which dictate the limits of reciprocation of said piston cylinder combination, and a step connecting said maximum and minimum points of rise for providing a rapid compression stroke of said piston under spring bias.

20. The apparatus of claim 19; said tracking surface tracking a circular path that is transverse to and centered on said axis of reciprocation, said piston being reciprocal in said cylinder which is stationary relative to said housing, said piston connected for reciprocation in said cylinder by said driving movement.

21. The apparatus of claim 20 wherein said piston is connected to said cam follower and said pendulum means is connected to said cam.

22. The apparatus of claim 21 wherein said piston is keyed to rotate with said cylinder and said housing.

23. The apparatus of claim 17 including pressure level means operably connected to said pump for establishing and maintaining air pressure in the tire at a predetermined level.

24. The apparatus of claim 17 including a cover which covers said pendulum, said cam and said cam follower for sealing the same from contamination.

25. The apparatus of claim 24 wherein said cover is detachably secured to said pump housing.

* * * * *